Sept. 2, 1924.
J. A. STACKHOUSE
VEHICLE ATTACHMENT
Filed April 8, 1922    2 Sheets-Sheet 1
1,506,952
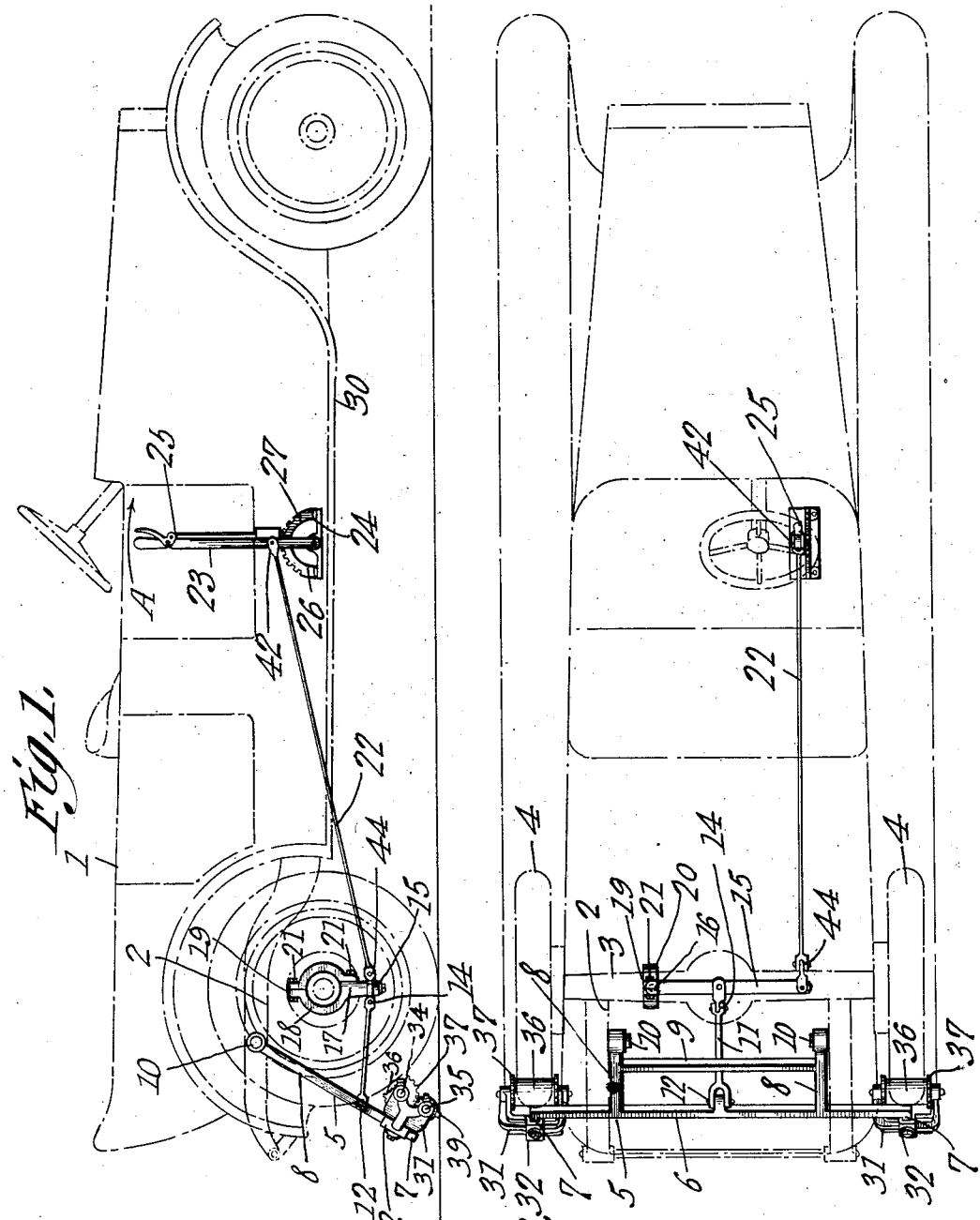
Inventor
J. A. Stackhouse
By C. A. Snow & Co.
Attorney Sept. 2, 1924.  
J. A. STACKHOUSE  
VEHICLE ATTACHMENT  
Filed April 8, 1922
1,506,952
2 Sheets-Sheet 2
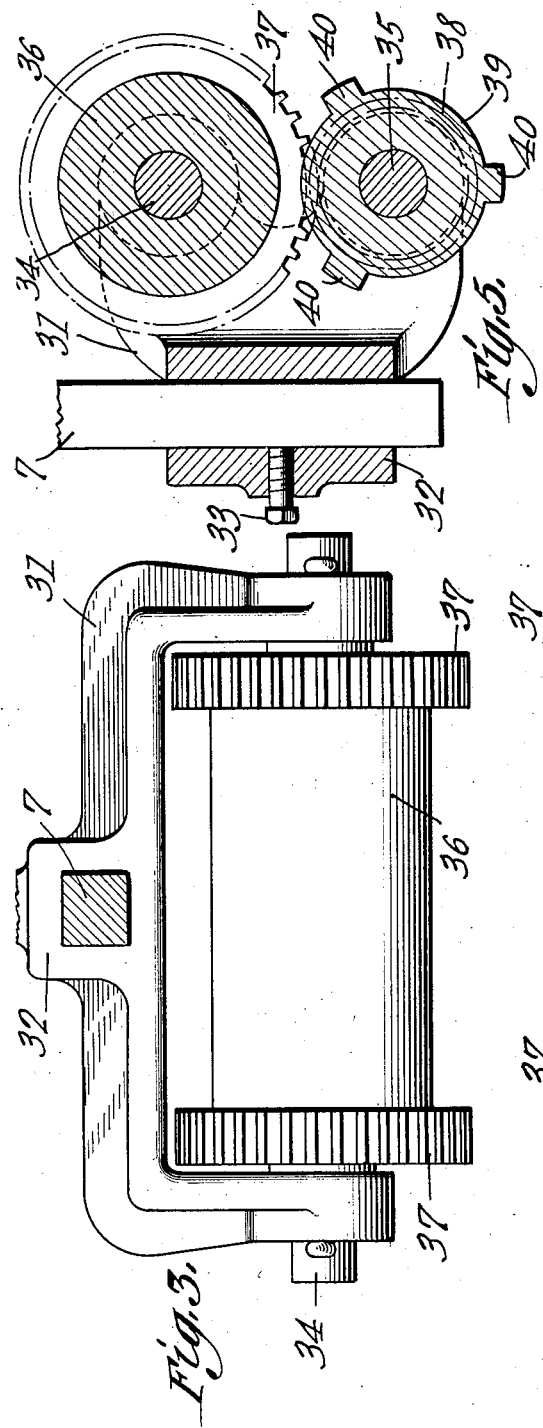
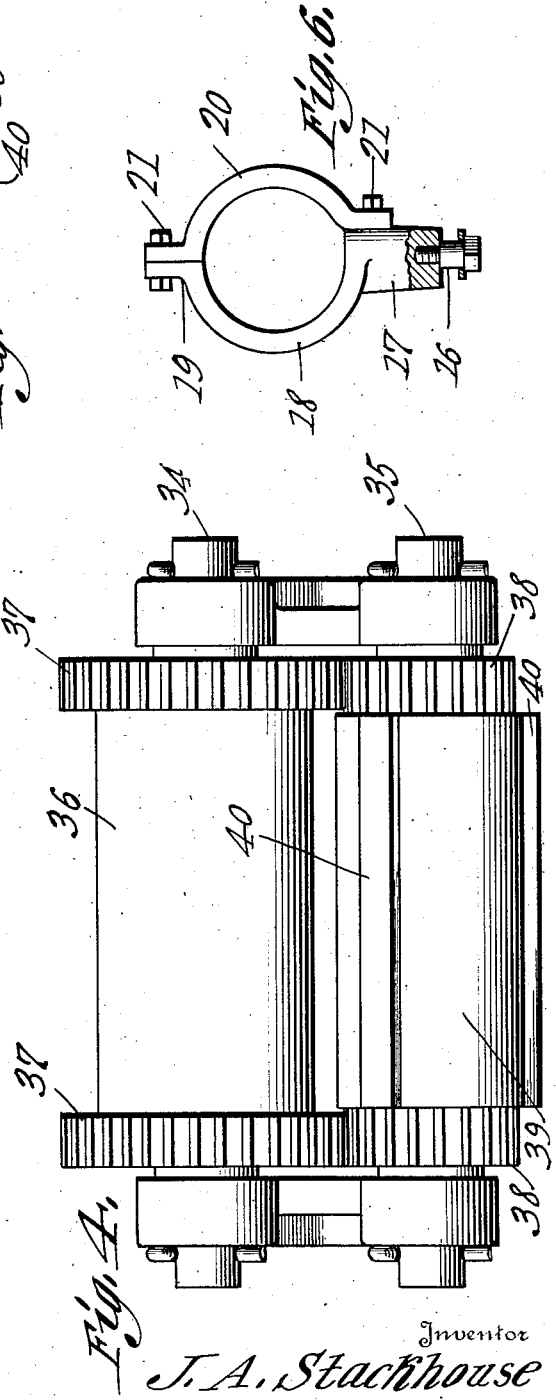
Inventor  
J. A. Stackhouse  
By C. A. Snow & Co.  
Attorney Patented Sept. 2, 1924.

UNITED STATES PATENT OFFICE.

JOHN A. STACKHOUSE, OF DOVER, NEW JERSEY, ASSIGNOR OF ONE-HALF TO JOSEPHINE KING, OF EAST DOVER, NEW JERSEY.

VEHICLE ATTACHMENT.

Application filed April 3, 1922. Serial No. 550,911.

*To all whom it may concern:*

Be it known that I, JOHN A. STACKHOUSE, a citizen of the United States, residing at Dover, in the county of Morris and State of New Jersey, have invented a new and useful Vehicle Attachment, of which the following is a specification.

This invention aims to provide novel means whereby when the wheels of a vehicle are slipping, on the ice, or elsewhere, the vehicle may nevertheless be propelled.

It is within the province of the disclosure to improve generally and to enhance the utility of devices of that type to which the invention appertains.

Although the preferred embodiment of the invention has been shown, a mechanic, working within the scope of the claims, may make changes in the form delineated, without departing from the spirit of the invention.

In the drawings:—Figure 1 shows in side elevation, a motor vehicle equipped with the attachment forming the subject matter of this application; Figure 2 is a top plan of the structure shown in Figure 1; Figure 3 is a plan of the support and parts carried thereby; Figure 4 is an elevation of the support; Figure 5 is a section through the support and parts associated therewith; Figure 6 is an elevation showing the fulcrum bracket.

The numeral 1 marks a motor vehicle of any kind the chassis being denoted by the numeral 2, the running board by the numeral 30, the rear axle casing by the numeral 3, and the power-driven rear wheels by the numeral 4.

In carrying out the invention, there is provided a frame 5 which operates like a radius arm, the frame comprising a cross bar 6 having angular fingers 7, arms 8 projecting from the cross bar, the arms being connected by a brace 9. The upper ends of the arms 8 are pivoted at 10 to the chassis 2, or elsewhere, and thus, the frame or radius arm 5 may be swung upwardly or downwardly.

The rear end of a link 11 is pivoted at 12 to the intermediate portion of the bar 6 and is pivoted at 14, at its forward end, to the intermediate portion of a lever 15, the lever being fulcrumed at 16, at one end, on a lug 17 formed on the member 18 of a clamp 19, the clamp including a member 20, the members 18 and 20 of the clamp being connected by securing elements 21, the clamp thus being held on the rear axle casing 3. The lever 15 swings horizontally and the outer end of the lever is pivoted at 44 to a forwardly extended connection or rod 22, pivoted at 42 to a lever 23 fulcrumed on any accessible part of the vehicle. The lever 23 has a latch mechanism 25 adapted to cooperate with the segment 24. If desired, the rear part of the segment may be colored white as indicated at 26, the forward portion of the segment being colored red, as indicated by the numeral 27.

A pair of U-shaped supports 31 is provided, each support having a socket 32 wherein the finger 7 on the bar 6 of the frame 5 is received, set screws 33 being threaded into the sockets to hold the fingers 7 therein. In each support 31, an upper shaft 34 and a lower shaft 35 are mounted. A first roller 36 is disposed between the side arms of the support 31 and is journaled on the upper shaft 34. The roller 36 has gear wheels 37 at its ends, meshing with pinions 38 on the ends of a roller 39 journaled on the shaft 35, the roller 39 having ribs 40, or other traction elements. The roller 39 may be alluded to as a rotatable traction member.

When the parts are arranged as shown in Figure 1, the lever 23 is swung until the latch mechanism 25 is engaged with the red part 27 of the segment 24, the coloring of the segment in different hues serving as a guide for the operator, the lever 23 imparting movement to the connection 22, the lever 15 swinging on its fulcrum 16, and the link 11 swinging the frame 6 on its pivotal supports 10, until the rollers 36 bear against the wheels 4 of the vehicle. Assuming that the wheels 4 are rotating, and slipping on the ice, the wheels will rotate the rollers 36, the gear wheels 37 and the pinions 38 will rotate the rollers 39, and the ribs 40, engaging the ice or the ground, will advance the vehicle.

The supports 31 may be adjusted on the fingers 17, to enable the rollers 36 and 39 to cooperate, respectively, with the wheel of the vehicle, and with the ground. The more that the lever 23 is swung in the direction of the arrow A in Figure 1, the harder will the roller 36 be crowded against the ground wheel, and the more effective will be the drive imparted from the wheel of the vehicle to the roller 36 and, consequently to the ground-engaging roller 39.

I claim:—

1. The combination with a vehicle including a ground wheel, of an arm mounted to swing on the vehicle, a support, rotatable members journaled on the support, one of said members being a ground-engaging traction member, and the other of said members being adapted for engagement with the ground wheel, intermeshing gears connecting the rotatable members, means for mounting the support on the arm for adjustment along the arm, to secure cooperation between said ground-engaging member and the ground, and between said wheel-engaging member and the wheel, and means under the control of an operator for swinging the arm from a remote point, to cause said rotatable members to exercise their respective functions.

2. The combination with a vehicle including a ground wheel, of an arm mounted to swing on the vehicle; rotatable members supported by the arm, one of said members having ground-engaging traction elements; intermeshing gears connecting the rotatable members; and means under the control of an operator for swinging the arm, to bring the other of said members into and out of engagement with the ground wheel.

In testimony that I claim the foregoing as my own, I have hereto affixed my signature in the presence of two witnesses.

JOHN A. STACKHOUSE.

Witnesses:
F. L. SEARCH,
MASON B. LAWTON.